United States Patent [19]
Waskiewicz

[11] Patent Number: 5,822,526
[45] Date of Patent: Oct. 13, 1998

[54] SYSTEM AND METHOD FOR MAINTAINING AND ADMINISTERING EMAIL ADDRESS NAMES IN A NETWORK

[75] Inventor: Edward Paul Waskiewicz, Redmond, Wash.

[73] Assignee: Microsoft Corporation, Redmond, Wash.

[21] Appl. No.: 655,084

[22] Filed: Jun. 3, 1996

[51] Int. Cl.$^6$ .................................................. G06F 15/16
[52] U.S. Cl. .............................. 395/200.36; 395/200.37; 395/200.48
[58] Field of Search .................. 395/200.36, 200.37, 395/200.75, 200.47, 200.48, 200.01; 370/259; 379/93.24, 100.08; 340/825.53

[56] References Cited

U.S. PATENT DOCUMENTS

| | | | |
|---|---|---|---|
| 5,125,075 | 6/1992 | Goodale et al. | 395/200.36 |
| 5,315,705 | 5/1994 | Iwami et al. | 395/200.75 |
| 5,459,717 | 10/1995 | Mullan et al. | 370/351 |
| 5,481,698 | 1/1996 | Itoh et al. | 395/200.36 |
| 5,513,126 | 4/1996 | Harkins et al. | 395/200.58 |
| 5,630,060 | 5/1997 | Tang et al. | 395/200.68 |
| 5,632,018 | 5/1997 | Otorii | 395/200.36 |
| 5,706,434 | 1/1998 | Kremen et al. | 395/200.36 |

*Primary Examiner*—William M. Treat
*Assistant Examiner*—Zarni Maung
*Attorney, Agent, or Firm*—Leydig, Voit & Mayer, Ltd.

[57] ABSTRACT

A system and method are disclosed for performing the functions of administering a set of email mailboxes and executing requests by email users to transfer email messages between the email computer system and a foreign email system via established gateways. Rather than restrict an email address to the relatively static user account name, a proxy list associated with the mailbox for a particular account stores an extensible set of proxy addresses. A message will be delivered to a mailbox wherein any one of the proxy addresses matches the destination address for a given address type. A mailbox may have multiple proxy addresses for a same address type. When a message is sent to a foreign system, the originator address corresponds to a primary proxy address of the address type corresponding to a gateway used to transmit the message to the foreign system.

12 Claims, 6 Drawing Sheets

| USER NAME | MAILBOX LOGICAL ADDRESS | PROXY LIST |
|---|---|---|
| mjones | [sales\email\msj] | SMTP:MikeJones@CompanyX.COM<br>smtp:mjones@CompanyX.COM<br>X400:c=us;a=comx;o=cbu;g=Mike;s=Jones;<br>MS:COMX/CBU/MJONES |
| jamest | [engin\email\jmt] | SMTP:JimThompson@CompanyX.COM<br>smtp:jamest@CompanyX.COM<br>X400:c=us;a=comx;g=James;s=Thompson;<br>X400:c=us;a=comx;s=jamest;<br>MS:COMX/CBU/JIMTHOMPSON |
| marysm | [market\email\mls] | SMTP:MaryJohnson@CompanyX.COM<br>smtp:marysm@CompanyX.COM<br>X400:c=us;a=comx;g=Mary;s=Johnson;<br>X400:c=us;a=comx;g=Mary;s=Smith;<br>MS:COMX/CBU/MJOHNSON |
| . . . | | |
| allenm | [engin\email\aem] | SMTP:allenm@CompanyX.COM<br>X400:c=us;a=comx;s=allenm<br>MS:COMX/CBU/ALLENM |

FIG. 3

| TYPE | VALVE |
|---|---|

SYSTEM AND METHOD FOR MAINTAINING AND ADMINISTERING EMAIL ADDRESS NAMES IN A NETWORK

AREA OF THE INVENTION

The present invention is directed to methods and apparatuses for delivering messages to identified destinations (e.g., electronic mailboxes) via computer networks. In particular, the present invention concerns administering email addresses in a system where user account names are tied to a number of administrative and resource databases and therefore cannot be easily changed.

BACKGROUND OF THE INVENTION

Electronic mail systems (hereinafter referred to as "email systems") perform a number of functions such as, for example, creating, transferring, storing, and retrieving text, graphics, images and voice data by electronic means (hereinafter referred to as "email") for accounts having associated email addresses. Gateway devices are incorporated into known email systems to facilitate transmitting and receiving email between entities (e.g., users, suggestion boxes, etc.) residing on different email systems. More specifically, gateways perform email address translation functions enabling local email entities to receive email from email sources operating under a different protocol (referred to as "foreign" email systems). Gateways also generate a return address, from a user account name that is inserted in an email message transmitted to a foreign system, in the native address format of the foreign system.

A gateway is typically associated with a particular transfer protocol comprising a set of rules for the form and manner of transmitting email and only communicates via email incorporating that transfer protocol. A gateway "type" hereinafter refers to a particular transfer protocol (e.g., SMTP, X.400, etc.). Because many large network systems today are expected to send and receive mail to a number of foreign systems having a variety of gateway types, the large systems often include a number of different gateway types. Because each gateway is dedicated to corresponding with gateways of only one particular gateway type, multiple gateways are incorporated into large email systems in order to ensure the existence of a compatible gateway for receiving an email message from a foreign email source.

In known email systems, the address translation functions performed by the gateways are generally tied to user account names. When an email message is received by a gateway, the gateway performs mapping functions on the address portion of the received email message (matching the gateways' particular type) in order to deduce the intended recipient's account name. The account name is then used to identify the recipient's mailbox address.

Similarly, when a user transmits an email message to a destination in a foreign system, a gateway generates a return address to be used by a recipient when sending a response. The return address is based upon the user's account name. As a consequence, a user's email address cannot be changed without changing the user's account name. Moreover, the account name and the email address corresponding thereto typically revealed to a certain extent the user's identity.

Changing a user's account name in small, simple networks may not be considered a major task. However, in large networks, such as those maintained by many businesses today, a number of databases and resources on separate servers will likely be keyed to the user's account name. Changing a user's account name in such systems requires changing every database containing the account name. In such an environment, changing a user's account name is a very difficult task due to the necessity to change the user's account name in each and every one of the databases and resources that rely upon the user's account name. As a result, notwithstanding the existence of legitimate grounds for a user requesting an account name change, once a user is initially assigned an account name, changing the account name is greatly discouraged and rarely performed.

SUMMARY OF THE INVENTION

Accordingly, it is a primary object of the present invention to provide a system and method for facilitating changes to email account names.

Another object of the present invention is to reduce administrative overhead for carrying out an account name change.

Another object of the present invention is to provide a system and method as characterized above by which a user can directly change an email account name rather than submitting such a request to a network administrator to perform the task.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention comprises an electronic mail (email) system for facilitating communications between a set of entities within the email system and a foreign email system wherein email addresses for the set of mailboxes within the system are independently assignable with respect to account names with which the set of email mailboxes are associated. The email system includes a gateway for performing communications with the foreign email system under an established protocol. The responsibilities of the gateway include receiving an email transmission having a recipient email address portion and a message portion.

The email system also includes a directory comprising a set of entries associated with the set of email entities. In addition to mailbox entries, the email entities include, for example, such entities as distribution lists, public folders, remote recipients and mailbox agents. Each mailbox entry, corresponding to an email mailbox, includes an identification corresponding to an address within the email system for storing received email messages. While the directory may simply provide an actual location (such as a sub-directory in a file system) for storing email messages associated with a particular email mailbox, the preferred system uses well known "handles" providing a system level reference for accessing the email mailbox. Each mailbox entry, in contrast to known email systems, also includes a proxy list. The proxy list is capable of storing one or more proxy addresses. Each proxy address is independently assignable with respect to the account name with which the mailbox is associated, and corresponds to the recipient email address portion of the email transmission.

The email system also includes a directory agent for performing a search upon the set of entries in order to locate a proxy address within the directory matching the recipient email address portion of the email transmission and returning the identification for an electronic mailbox associated with the matched address. The email system then uses the identification to direct at least the message portion to an email mailbox associated with the identification.

The present invention provides many advantages. A user is permitted to add or modify a proxy address for the user without changing the user's account name. By removing the constraining relationship between a user's email address and the user's account name known in the prior systems, the email system embodying the present invention facilitates easy non-disruptive modifications to a user's email address. In fact, a user's email mailbox address (identified by means of a system level logical address) may have associated with it multiple proxy addresses. Thus, a user may in fact add a new proxy address, by means of a proxy address supplementation process, without extinguishing the ability of the email system to receive email including a former proxy address. By disassociating the user's email address from an account name, the system allows a user to have an email address that renders the user's identity completely anonymous.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE PREFERRED EMBODIMENT

Figure 1:
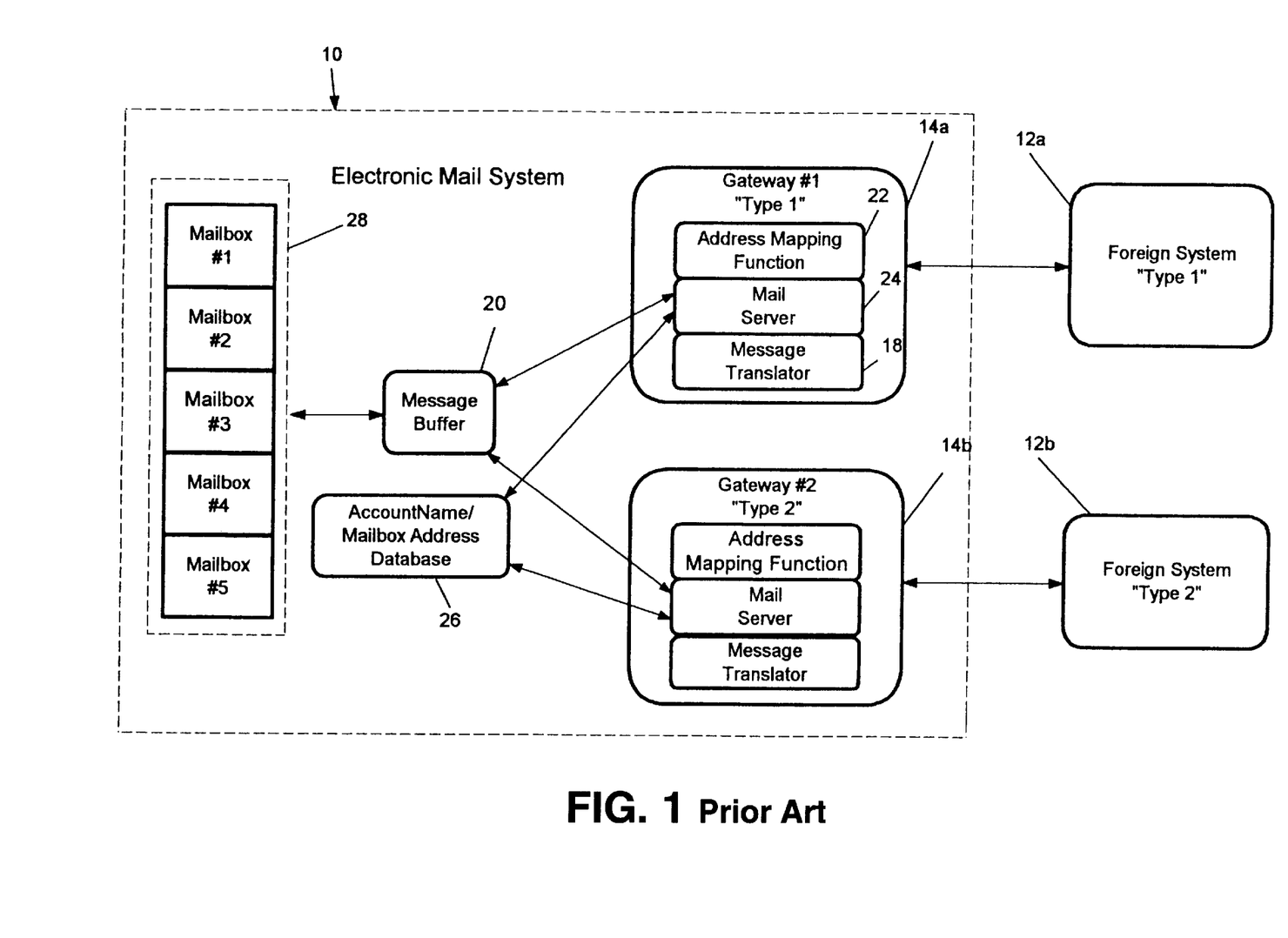
FIG. 1 schematically depicts a prior-art email system comprising multiple gateways for performing account name mapping functions based upon user account names.

FIG. 1 illustrates a prior art email system 10 shown in its intended environment. The email system 10 communicates with foreign email systems 12a and 12b, by means of gateways 14a and 14b respectively. The foreign email systems 12a and 12b respectively generate and process email addresses according to protocols (Type 1 and Type 2) practiced by the gateways 14a and 14b. The gateways 14a and 14b perform address translation functions according to a single established protocol for a particular address type. Examples of such address types are Simple Mail Transfer Protocol (SMTP) used for Internet communications and the X.400 protocol.

In the known system, after a gateway in the email system 10 (such as gateway 14a) receives an email message matching its address type, (e.g., SMTP), the gateway 14a separates the email message into an email address portion and a message portion. A message translator 18 converts the message portion according to the gateway 14a's native protocol, and the gateway 14a transfers the converted message to a message buffer 20. An address mapping function 22 converts the email address portion into an account name for an intended recipient of the email message, and then passes the account name to a mail server 24 on the gateway 14a. The mail server 24 queries an account database 26, containing a list of user account names and corresponding mailbox addresses, for a system level logical mailbox address corresponding to the account name provided by the address mapping function 22. The mailbox address corresponds to one of the mailboxes in a set of mailboxes 28. After retrieving the destination mailbox address, the mail server 24 transfers the converted received message from the message buffer 20 to the mailbox address obtained from the account database 26.

Similarly, when called upon to transmit a message from the email system 10 to the foreign email system 12a, the gateway 14a transmits a message from an originator mailbox including an email address corresponding to the source of the request. After receiving a request to transmit an email message, including an originator's account name and a destination address, the mail server 24 retrieves a message portion from the message buffer 20. The message translator 18 converts the message portion according to the native protocol of the gateway 14a. The address mapping function 22 converts the originator's account name to a form compatible with the native protocol of the gateway 14a to render an email address that identifies the source of the email message. The email address that identifies the source may be used by the recipient as a return address. Thereafter, the message, source address, and destination address are assembled into an email message that is transmitted by the gateway 14a to the foreign system 12a. Thus, the prior art email system 10 of FIG. 1 relies directly upon a user's account name in order to perform address mapping functions. One cannot change the user's email address without changing the user's account name. As previously explained, such a change can be very difficult in a complex network environment.

Figure 2:
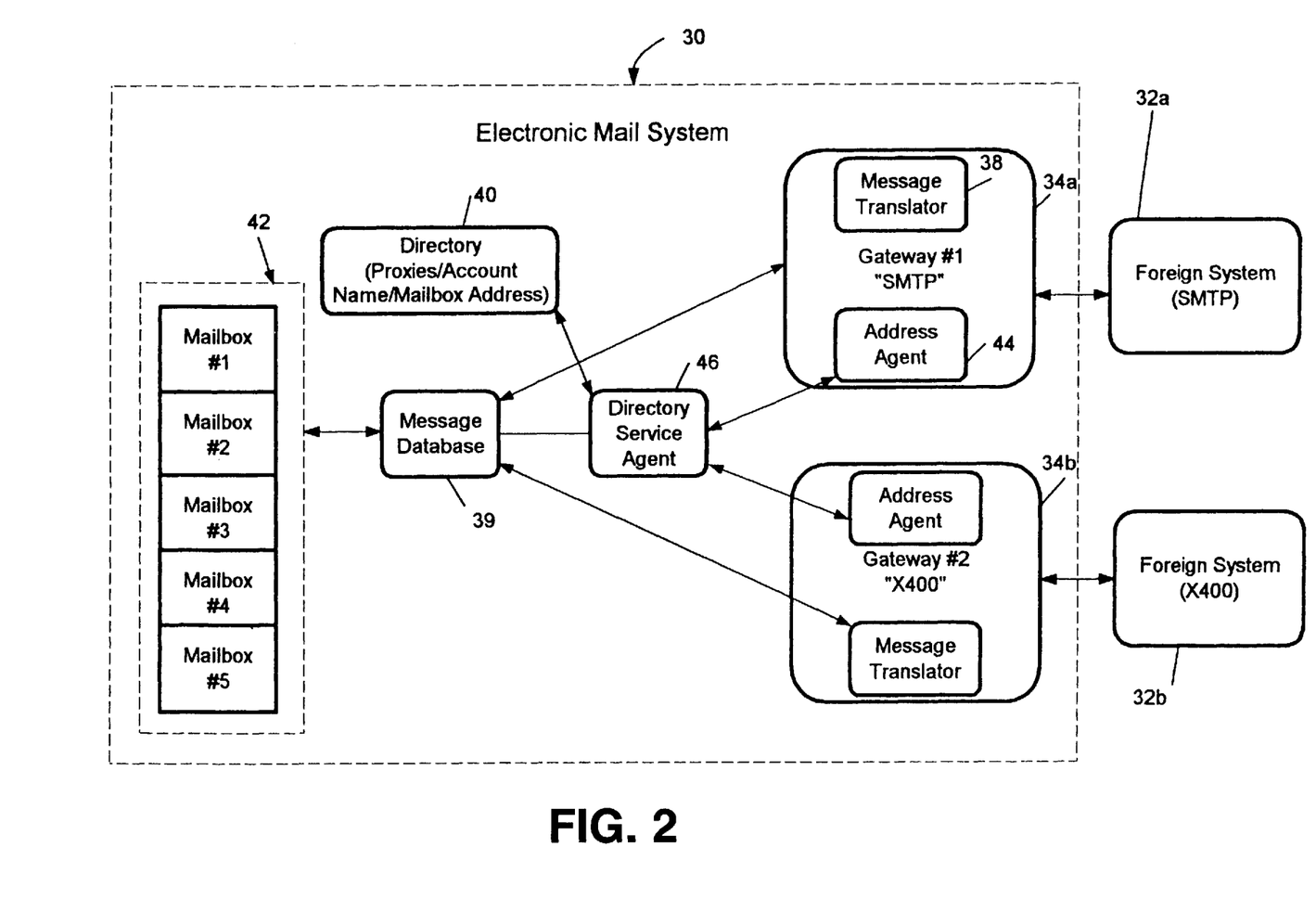
FIG. 2 is a schematic illustration of the overall structure of an email system in accordance with a preferred embodiment of the present invention.

Referring now to FIG. 2, a schematic diagram is provided of an email system 30 embodying the present invention. The illustrative email system communicates with foreign email systems 32a and 32b via gateways 34a and 34b, respectively. The email transmitted between the email system 30 and the foreign email systems 32a and 32b consists of a message portion, which is the message to be transmitted or received, and an email address portion.

As noted above, email message translation compensates for differences from a corresponding system's email formats and conventions due to the corresponding system's differing email transfer protocols. A message translator 38 converts the message portion of email received by the gateway 34a to a native format of the email system 30 and then transfers the message to a message database 39. When an email message is transmitted by the email system 30 to the foreign email system 32a, the message translator 38 retrieves the message portion from the message database 39 and converts the email message from the native format to a format recognized by the protocol of the foreign system 32a.

The email address portion of email embodying the present invention, while similar in appearance to the prior art account name-based email address, is distinguished by the fact that the email address portion is not constrained by a user's account name. Instead, the email address must match a proxy address, for an intended email recipient, that is merely associated with a user account name.

More specifically, one or more proxy addresses for a particular email recipient are stored in a directory 40 which contains information for associating each of the proxy addresses with a single account name and a system logical mailbox address identifying one of a set of mailboxes 42. The directory 40 is constructed such that proxy addresses for a user's mailbox are distinguished from the user's account name. A user is permitted to change a proxy address without changing the user's account name. As previously mentioned above, relaxing the formerly strict relationship between an email address and a user's account name facilitates easy non-disruptive modifications to a user's email address. The directory 40 is further enhanced by enabling a user's email mailbox address (identified by means of a system level logical address) to be associated with multiple proxy addresses. Thus, a user may in fact add a new proxy address, by means of a proxy address supplementation process, without extinguishing the ability of the email system 30 to receive email addressed to the user's mailbox by means of the user's former proxy address.

In accordance with one aspect of the present invention, when the email system 30 receives an email message at the gateway 34a, an address agent 44 forwards the email address portion, without modifications, to a directory service agent (DSA) 46. In response, the DSA 46 performs a query upon an index to the directory 40 in order to locate and then return a system level logical mailbox address corresponding to the email address. An email address is passed into the DSA 46, a database lookup is performed upon an alpha-numerically ordered list of email proxies for the email system 30. If a match is found, a handle is returned to the address agent 44. A negative delivery message is returned to the address agent 44 if a match is not found.

When an email user requests sending an email message to a foreign email system (e.g., foreign email system 32a), the address agent 44 submits the sender's user account name to the DSA 46 that, in turn, retrieves a primary proxy address (explained below) from the directory 40 based upon the gateway address type (e.g., SMTP). Thus, the general function of the DSA 46 is to perform the processes necessary for administering the directory 40 and to perform queries upon the directory 40 in response to requests from various components of the email system 30.

In the preferred embodiment of the invention the gateways 34a and 34b do not perform a mapping function on the proxy address when email is received. Processing of the email address portion of email is performed at the email mailbox object level in conjunction with the services performed by the DSA 46, and a flexible, object oriented system implementation and design is facilitated.

However, the gateways 34a and 34b are not precluded from performing some processing of the email address portion of email messages. For example, in an alternative embodiment of the present invention, the gateway may perform a processing function to account for differences in character set coding standards between systems. The present invention in this embodiment, and in the preferred embodiment, uses the American Standard for Information Exchange ("ASCII"). In this alternative embodiment, the gateway would have a conversion function to convert text formatted differently, such as according to the Extended Binary Coded Decimal Interchange Code ("EBCDIC").

Figure 3:
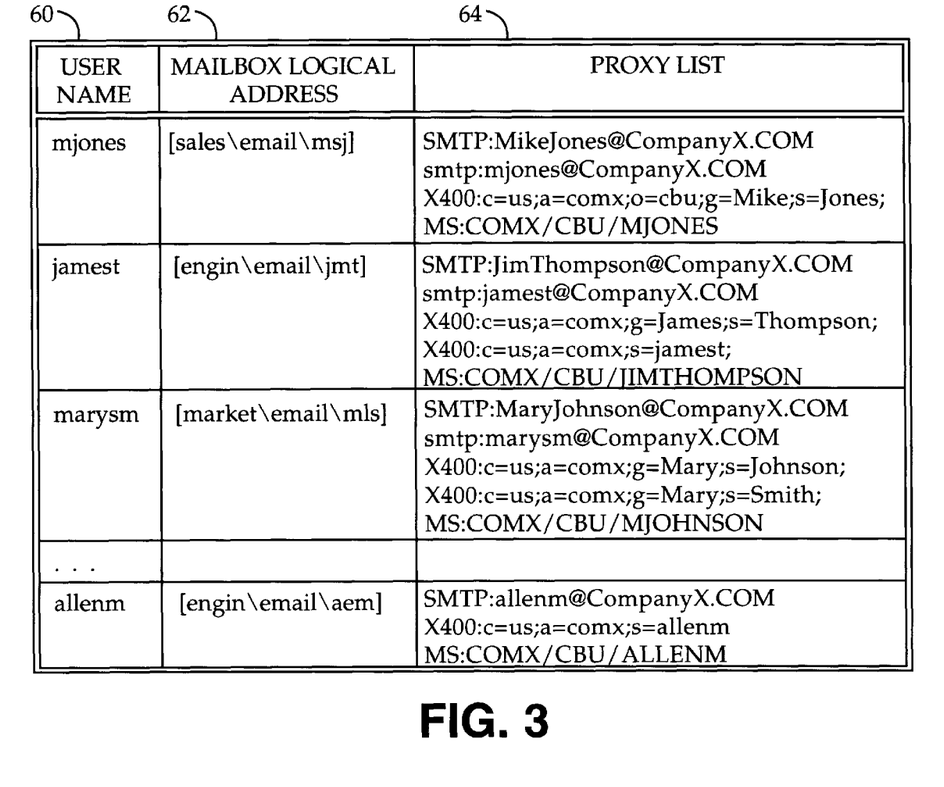
FIGS. 3 and 3a illustratively depict the contents of a directory element facilitating the use of email proxy addresses in place of user account names to designate a mailbox in accordance with the present invention.

Referring now to FIG. 3, portions of the directory 40 relating to associating proxy addresses with email addresses are illustratively depicted. A "User Name" portion 60 of the directory 40 lists user account names corresponding to email accounts. As mentioned above, the User Name portion 60 is similar to the user account name used in known systems to obtain an associated system level logical mailbox address for an account. System level logical mailbox addresses are provided in a Mailbox Logical Address portion 62 of the directory 40 (column 2 in FIG. 3). Rather than provide direct addresses for mailboxes, the system level logical mailbox addresses comprise handles referencing the actual logical addresses (in brackets). Handles are well known system level-references to objects which are issued for temporary reference to a particular resource and then discarded by the user of the handle. The use of handles enables the DSA 46 to withhold the actual address from requesting processes that may attempt to corrupt the system. The directory may be implemented as an array comprising a user account name entry and the other information illustratively depicted in FIG. 3.

A Proxy list portion 64 of the directory 40 comprises a new field in the directory which enables a user to designate user names for determining a mailbox address that are distinct from the (difficult-to-modify) user account name. The entries of the Proxy list portion 64 are preferably listed in an alpha-numerically ordered list of proxy addresses that are in turn linked to respective entries in the directory 40. Each entry in the Proxy list portion 64 is capable of storing multiple proxy addresses for a given user account. The multiple proxy addresses, as will be evident from the illustrative examples, include both proxy addresses for distinct address types, (e.g., SMTP and X.400), as well as proxy addresses for a same address type (e.g., MikeJones@CompanyX.COM and mjones@CompanyX.COM).

When a new mailbox object is created for a designated user account, a proxy address is created and stored in the Proxy list portion 64 for each address type currently installed on the email system 30. Thus, in the illustrated example, each user account is associated with at least an SMTP, an X.400, and a PC-Mail proxy address after the new mailbox object is created.

The presence of multiple proxy addresses for a same address type typically arises when a previously designated email address is replaced by a new email address. Saving the previous email address enables the user to continue receiving email addressed to the previous address for instances where senders are not aware of the user's new email address. On the other hand, it is intended that the user should not use the old address once a new email address is selected. In the preferred embodiment of the present invention, a primary proxy is designated for each address type represented in the entry in the Proxy list portion 64. In the preferred embodiment of the present invention, the primary proxy is distinguished from other proxies by using upper-case lettering for the text string in a proxy address designating the address type. As will be explained further below, when email is sent by a user having multiple proxy addresses for a given address type, the DSA 46 retrieves the proxy address having the requested address type in upper-case letters, thus retrieving the primary proxy address.

Figure 3A:
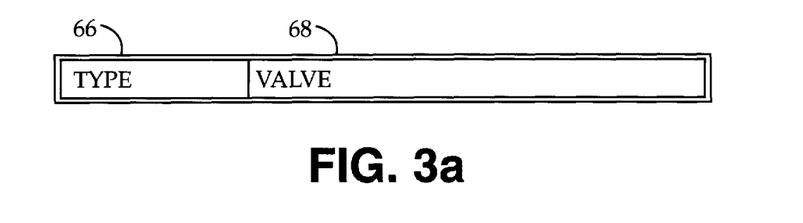

As shown in FIG. 3a, each proxy comprises a TYPE field 66 and a VALUE field 68. The TYPE field 66, set apart from the VALUE field 68 by a ":" (colon) designates the address type with which a particular proxy address is associated. The VALUE field 68 is a gateway-dependent text string that designates a gateway-specific address for a particular user account. In the preferred embodiment of the present invention, the contents of the TYPE field 66 and VALUE field 68 are stored as alpha-numeric text in order to facilitate easy presentation of this information by application software. In the preferred embodiment of the present invention, the maximum total length of the TYPE field 66 is preferably 8, and the combined length of the TYPE field 66 and VALUE field 68 is not more than 1120 bytes—though the length is not considered material to the invention.

Figure 4:
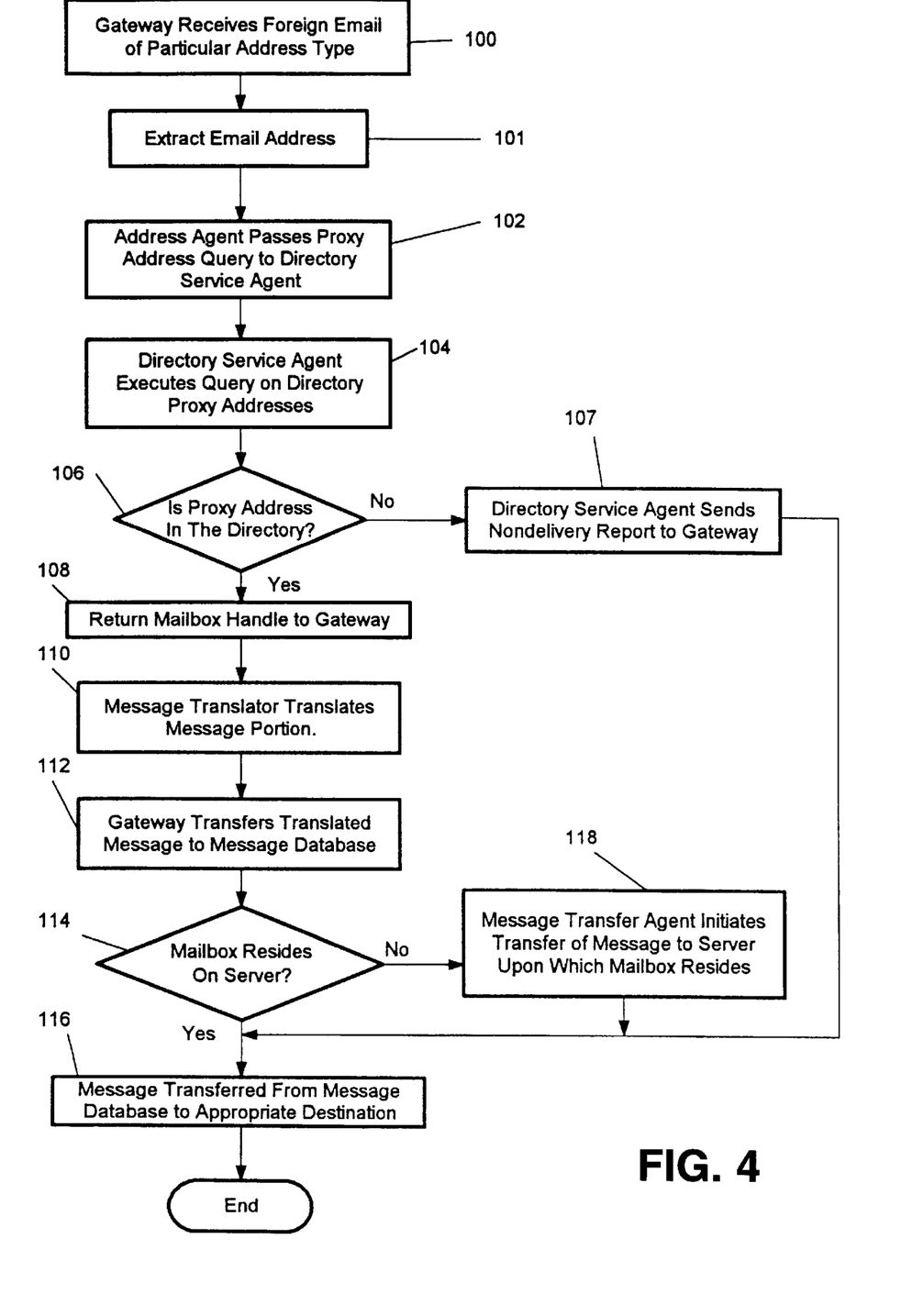
FIG. 4 is a flowchart summarizing the steps for receiving and storing an email message from a foreign system according to a preferred embodiment of the present invention.

Having described the general composition of an email system 30 incorporating the present invention, attention is now directed to the steps performed by the system to store received email, send email to foreign systems, and modify the contents of the email proxy in accordance with the preferred embodiment of the present invention. Referring to FIG. 4, the steps are summarized for receiving and storing an email message from a foreign system, such as email system 32a, by the email System 30. In this particular example, the email message is transmitted with an SMTP address type. However, the steps depicted in FIG. 4 are applicable to generally any address type.

At step 100, the gateway 34 receives an email message designating an SMTP address type from the foreign email system 32a. Thereafter, at step 101 the email address is extracted from the email message by the gateway 34a. The address agent 44 creates a proxy address query by appending the address to the address type (i.e., SMTP) for the received message and forwards the query to the DSA 46 (step 102).

At step 104, the DSA 46 executes the query on the directory 40. In general, this is accomplished at step 104 as the DSA 46 scans the proxy addresses associated with user accounts and compares them to the query until either a match is located or the searching engine determines that a matching proxy address does not exist in the directory 40. While a directory searching engine could traverse a non-ordered list in search of a matching address, in large email systems comprising thousands of users, the proxy addresses are alpha-numerically ordered in order to reduce searching. The manner in which the proxy addresses are organized and searched is not intended to limit the present invention in its broadest respect. In any event, if no match is found during step 106, then control passes to step 107 wherein the DSA 46 issues a non-delivery report to the gateway 34a. The gateway 34a returns the non-delivery report to the originator of the email message in a known manner during step 116. Control then passes to the End.

Conversely, if the DSA 46 successfully identifies a match during step 106 for the query submitted by the address agent 44, then control passes to step 108 wherein the DSA 46 generates and returns a handle for a mailbox object corresponding to the query to the gateway 34a.

Next, at step 110 the message translator 38 converts the message portion of the received email message into the native form of the electronic mail system 30. At step 112 the gateway 34a passes the translated email message to the message database 39 along with the handle passed to the gateway 34a during step 108. Next, at step 114 the message database 39 queries the DSA 46 to determine whether the mailbox is on the local email system 30. If the mailbox referenced by the handle is local to the email system 30, then control passes to step 116 and message database 39 stores the buffered message in the (local) mailbox referenced by the handle. Control then passes to the End.

However, if at step 114, the DSA 46 instead indicates a non-local message, then control passes to step 118 wherein the message database 39 passes the email message to a message transfer agent (not shown in FIG. 2). The message transfer agent forwards the message to a non-local server upon which the appropriate mailbox resides (in order to perform a similar proxy address query). After transferring the message to the proper server (step 116), control passes to the End.

Figure 5:
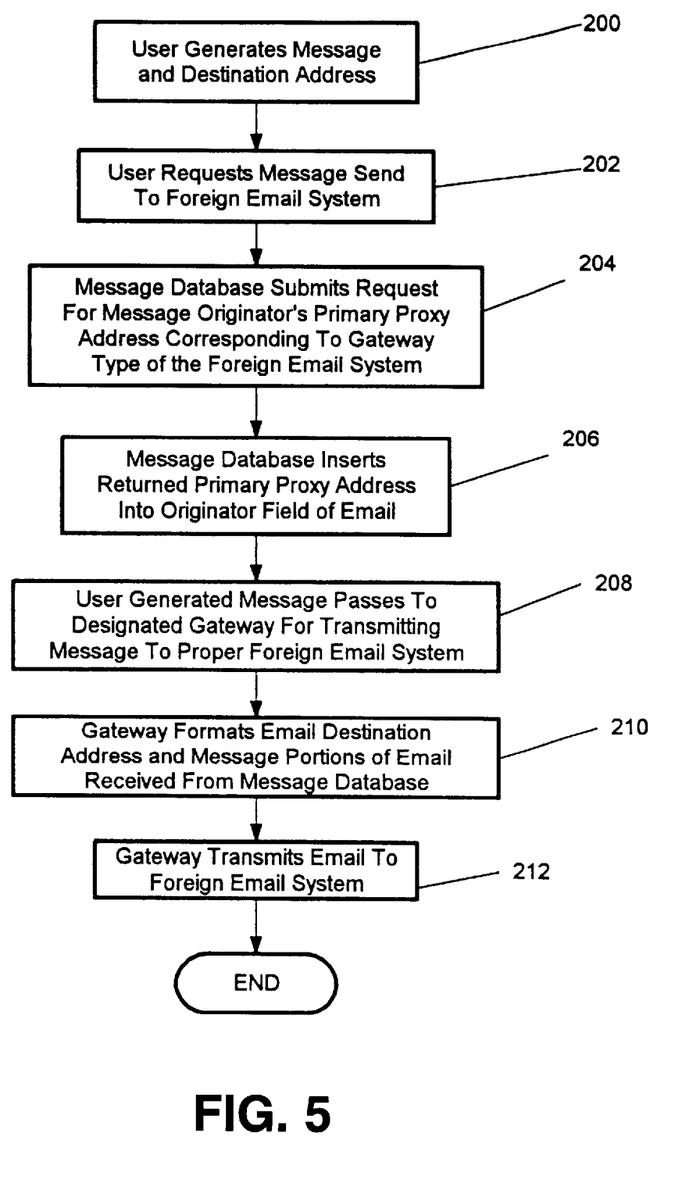
FIG. 5 is a flowchart summarizing the steps performed by an email system to transmit email to a foreign system in accordance with a preferred embodiment of the present invention.

Referring now to FIG. 5, a flowchart summarizes the general steps for transmitting an email message for a user having multiple proxy addresses, (possibly including multiple proxy addresses for a same address type), in accordance with the preferred embodiment of the present invention. More particularly, during step 200 a user generates a message portion and a destination address corresponding to a foreign email system, such as foreign email system 32a. The message and address initially reside in the message database 39. Next, at step 202 the user requests the email system 30 to send the message to the foreign email system 32a. In response, at step 204 the message database 39 submits a request to the DSA 46 (FIG. 2) to provide a primary proxy address, for the message originator, corresponding to the address type (SMTP) for the gateway 34a. The primary proxy address is used by the email system 30 to identify a return address in messages sent to the foreign email system 32a.

Next at step 206, after the DSA returns a primary proxy address, the message database 39 inserts the value portion of the primary proxy address into the "originator" portion of the email message. The primary proxy address therefore serves the function of the return address for the email. Control then passes to step 208 wherein the complete email message is forwarded from the message database 39 to the gateway 34a. At step 210, the message translator 38 converts the message and destination email address portions of the email message into the format of the foreign system 32a. Finally, at step 212 the email message is forwarded by the gateway 34a in a well known manner to the foreign email system 32a.

It is noted that the gateway 32a does not need to perform any translation of the originator address provided by the message database 39, since the originator address is already in the form for transmission to the foreign email system 32a when it is submitted by the message database 39 to the gateway 34a. Furthermore, as previously mentioned, the return address in prior systems, corresponding to the user name of the sender, often reveals the identity of an email sender. A user however, may wish to send email and provide a return address, but not wish to disclose his/her user account name—a restriction imposed by prior art systems. In accordance with a potentially desirable aspect of the preferred embodiment of the present invention, an email originator in the present system can designate, via a "change primary proxy address" routine, an arbitrary alpha-numeric text string for a primary proxy address (inserted in the "From" field of the email message) thereby concealing the originator's user account name. The receiver of the email may transmit a response to the sender using the arbitrary text string for a return address.

Figure 6:
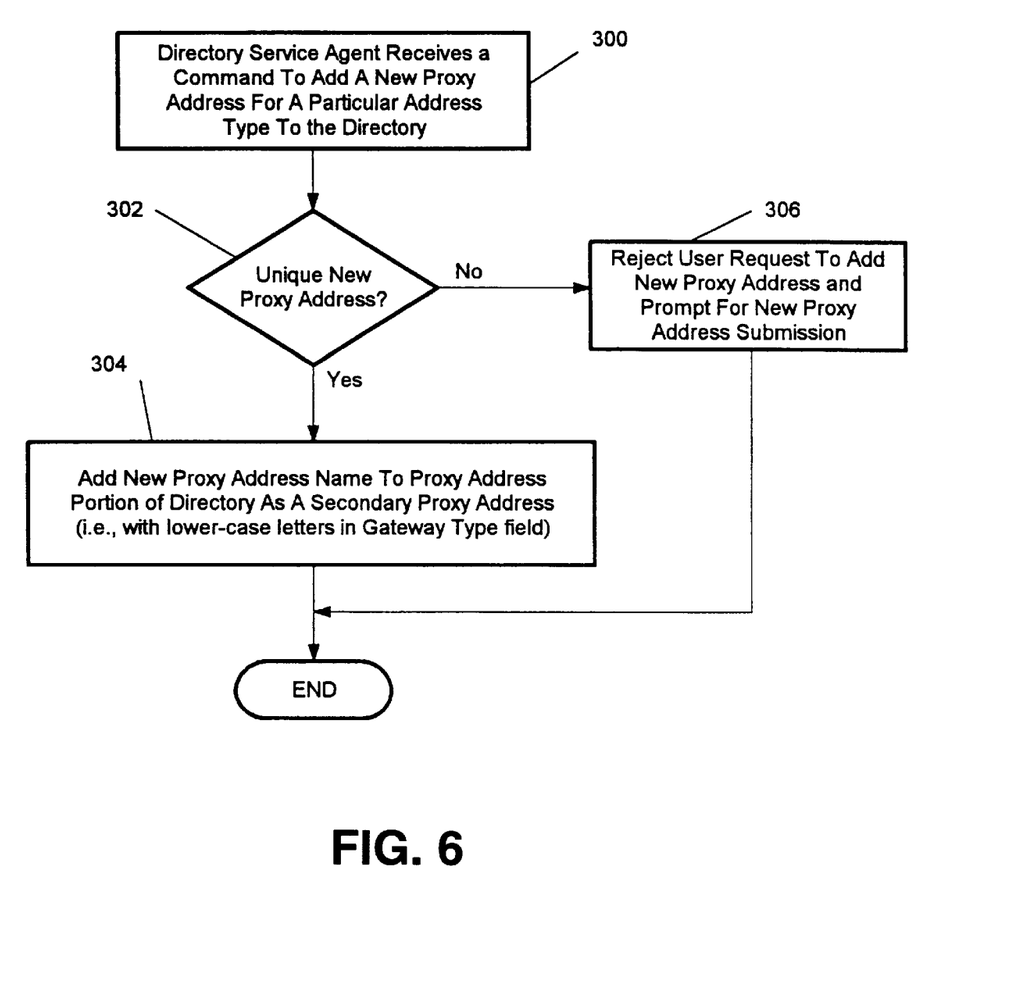
FIG. 6 is a flowchart summarizing the steps performed by an email system to add a proxy address to a proxy list in accordance with a preferred embodiment of the present invention.

Referring now to FIG. 6, the flowchart depicted therein summarizes the general steps for adding a new proxy address of a particular address type and email account to the Proxy list portion 64 of the directory 40. It is noted that when a new proxy address is added, it is designated as a secondary proxy address. All previously existing proxy addresses, including the primary proxy address, are maintained in their pre-addition state. Designation of a new primary proxy address is performed in a straight-forward manner by means of a separate routine. At step 300, a user submits an add proxy request to the DSA 46. In response, at step 302 the DSA 46 determines whether the user has submitted a proxy address that is unique to the email system 30. If the new proxy address is unique, then control passes to step 304 wherein the DSA 46 inserts the new proxy address submitted during step 300 into the Proxy list portion 64 of the directory 40 as a supplementary proxy address.

However, if at step 302 the DSA 46 instead determines that the proxy address submitted by the user during step 300 matches a previously existing proxy address, then control passes to step 306. At step 306, the DSA 46 issues a proxy address conflict message to the email system 30 which is then forwarded to the user. The user may then be prompted to try a new proxy address and/or the routine is exited by passing control to the End.

The above example is just one example of the many ways in which a user or administrator can manipulate a proxy list corresponding to an email mailbox for a user account without in any way impacting an associated user account name. For example, a user may delete a currently existing proxy address. A user may edit a currently existing proxy address—the equivalent of adding a new proxy address and deleting a former proxy address. All of these changes to the email proxy address without having to carry the change to other segments of network identification facilities such as user logons, group memberships, etc.

As can be seen from the foregoing detailed description, a system and method have been provided that facilitate changes to email address names. Administrative overhead for carrying out such name changes are reduced. User can directly change their email addresses rather than submitting such requests to an account administrator.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An email directory for an email system including a set of email mailboxes, the email directory comprising:
    a directory database for maintaining a set of entries associated with the set of email mailboxes, each entry for an email mailbox comprising:
       an identification corresponding to an address within the email system for storing received email messages addressed to the email mailbox; and
       a proxy list comprising a proxy address, independently assignable with respect to an account name with which the email mailbox is associated, the proxy address identifying the email mailbox; and
    search means for performing a search upon proxy addresses within the set of entries in order to locate a proxy address within the directory matching a recipient email address portion of a received email transmission and returning the identification for the corresponding email mailbox.

2. The email directory of claim 1 wherein the proxy list comprises an extensible structure for storing proxy addresses.

3. The email directory of claim 2 wherein the search means comprises means for distinguishing within a proxy list between a first proxy address associated with a first address type, and a second proxy address associated with a distinct second address type.

4. The email directory of claim 3 wherein the search means includes means for identifying an address type with which a proxy address is associated.

5. The email directory of claim 4 wherein the search means further comprises means for identifying a matching proxy address based upon an email address value interpreted in view of an address type with which the matching proxy address is associated.

6. The email directory of claim 2 wherein the search means includes means for distinguishing a primary proxy address from non-primary proxy addresses of a same address type and associated with a same electronic mailbox.

7. The email directory of claim 2 further comprising means for adding a new proxy address to the proxy list.

8. The email directory of claim 7 further comprising means for verifying that an email address submitted to the means for adding does not match a previously existing proxy address in the entries of the directory database.

9. An email system for facilitating communications between a set of email mailboxes within the email system and a foreign email system, the email system comprising:
    a gateway for performing communications with the foreign email system under an established protocol, the gateway receiving an email transmission having a recipient email address portion and a message portion;
    a directory database for maintaining a set of entries associated with the set of email mailboxes, each entry for an email mailbox comprising:
       an identification corresponding to an address within the email system for storing received email messages addressed to the email mailbox; and
       a proxy list comprising a proxy address, independently assignable with respect to an account name with which the email mailbox is associated, the proxy address identifying the email mailbox;
    search means for performing a search upon proxy addresses within the set of entries in order to locate a proxy address within the directory matching a recipient email address portion of a received email transmission and returning the identification for the corresponding email mailbox; and
    means for directing at least the message portion to an email mailbox associated with the identification.

10. A method for performing email communications between a set of email mailboxes within an email system and a foreign email system wherein the email system includes a directory database for maintaining a set of entries associated with the set of email mailboxes, and each entry for an email mailbox comprises (1) an identification corresponding to an address within the email system for storing received email messages addressed to the email mailbox, and (2) a proxy list comprising a proxy address, independently assignable with respect to the account name with which the email mailbox is associated, identifying the email mailbox, the method comprising:
    receiving, by a gateway, an email transmission from the foreign system according to an established protocol, the email transmission including a recipient email address portion and a message portion;

matching a proxy address within the directory database to the recipient email address portion, and in response generating a reference to an email mailbox corresponding to the matching proxy address; and directing at least the message portion to the email mailbox corresponding to the matching proxy address.

11. The method of claim 10 further comprising the step of forwarding, by the gateway, the recipient email address portion to a directory searcher.

12. The method of claim 10 further comprising the step of issuing an email message from the email system via the gateway, said step of issuing further comprising the substeps of:

creating an email message buffer including an email message portion and a destination address;

retrieving a primary proxy address from the directory database corresponding to the address type associated with the gateway;

inserting the primary proxy address into the email message buffer thus creating a gateway-ready email message; and forwarding the gateway-ready email message to the gateway.

* * * * *